(12) United States Patent
Akira et al.

(10) Patent No.: US 10,312,507 B2
(45) Date of Patent: Jun. 4, 2019

(54) NEGATIVE-ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: Sanyo Electric Co., Ltd., Daito-shi, Osaka (JP)

(72) Inventors: Tatsuya Akira, Osaka (JP); Yoshio Kato, Osaka (JP); Hiroshi Minami, Hyogo (JP); Taizou Sunano, Tokushima (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 63 days.

(21) Appl. No.: 15/524,030

(22) PCT Filed: Jan. 18, 2016

(86) PCT No.: PCT/JP2016/000222
§ 371 (c)(1),
(2) Date: May 3, 2017

(87) PCT Pub. No.: WO2016/121326
PCT Pub. Date: Aug. 4, 2016

(65) Prior Publication Data
US 2017/0331102 A1    Nov. 16, 2017

(30) Foreign Application Priority Data

Jan. 28, 2015 (JP) ................ 2015-014158
Dec. 25, 2015 (JP) ................ 2015-252962

(51) Int. Cl.
*H01M 4/36* (2006.01)
*H01M 4/38* (2006.01)
(Continued)

(52) U.S. Cl.
CPC ............ *H01M 4/364* (2013.01); *C01B 33/32* (2013.01); *H01M 4/386* (2013.01);
(Continued)

(58) Field of Classification Search
CPC ...... H01M 4/364; H01M 4/625; H01M 4/386; H01M 4/5825; H01M 4/366; H01M 2004/027; C01B 33/32
See application file for complete search history.

(56) References Cited

U.S. PATENT DOCUMENTS

| | | |
|---|---|---|
| 2003/0053945 A1 | 3/2003 | Fukuoka et al. |
| 2011/0244333 A1 | 10/2011 | Kawada |
| 2011/0244334 A1 | 10/2011 | Kawada |

FOREIGN PATENT DOCUMENTS

| | | | |
|---|---|---|---|
| CN | 103400971 | * 11/2013 | ............ H01M 4/134 |
| CN | 103400971 A | 11/2013 | |

(Continued)

OTHER PUBLICATIONS

Machine translation of CN 103400971, retrived from <https://worldwide.espacenet.com/?locale=en_EP> on Aug. 27, 2018.*
(Continued)

*Primary Examiner* — Cynthia K Walls
(74) *Attorney, Agent, or Firm* — Westerman, Hattori, Daniels & Adrian, LLP

(57) ABSTRACT

The initial charge/discharge efficiency and cycle characteristics of a non-aqueous electrolyte secondary battery that contains a silicon material as a negative-electrode active material are improved. A negative-electrode active material particle (10) according to an embodiment includes a lithium silicate phase (11) represented by $Li_{2z}SiO_{(2+z)}$ $\{0<z<2\}$ and silicon particles (12) dispersed in the lithium silicate phase (11). A lithium silicate constituting the lithium silicate phase has a crystallite size of 40 nm or less. The crystallite size is
(Continued)

calculated using the Scherrer equation from the half-width of a diffraction peak of a (111) plane of the lithium silicate in an XRD pattern obtained by XRD measurement of the negative-electrode active material particle 10.

13 Claims, 3 Drawing Sheets

(51) Int. Cl.
*H01M 4/58* (2010.01)
*H01M 4/62* (2006.01)
*C01B 33/32* (2006.01)
*H01M 4/02* (2006.01)

(52) U.S. Cl.
CPC ......... *H01M 4/5825* (2013.01); *H01M 4/625* (2013.01); *H01M 4/366* (2013.01); *H01M 2004/027* (2013.01)

(56) References Cited

FOREIGN PATENT DOCUMENTS

| | | |
|---|---|---|
| JP | 2003-160328 A | 6/2003 |
| JP | 2007-59213 A | 3/2007 |
| JP | 2011-222151 A | 11/2011 |
| JP | 2011-222153 A | 11/2011 |
| JP | 2011-233245 A | 11/2011 |
| JP | 2013-161705 A | 8/2013 |
| JP | 2014-103019 A | 6/2014 |
| JP | 2015-153520 A | 8/2015 |

OTHER PUBLICATIONS

International Search Report dated Apr. 5, 2016, issued in counterpart application No. PCT/JP2016/000222. (2 pages).
English Translation of Chinese Search Report dated Aug. 28, 2018, issued in related Chinese Patent Application No. 201580042918.5 (2 pages).

* cited by examiner

NEGATIVE-ELECTRODE ACTIVE MATERIAL FOR NON-AQUEOUS ELECTROLYTE SECONDARY BATTERY, AND NON-AQUEOUS ELECTROLYTE SECONDARY BATTERY

TECHNICAL FIELD

The present disclosure relates to a negative-electrode active material for a non-aqueous electrolyte secondary battery and a non-aqueous electrolyte secondary battery.

BACKGROUND ART

It is known that more lithium ions per unit volume can be intercalated into silicon materials, such as silicon (Si) and silicon oxides represented by $SiO_x$, than into carbon materials, such as graphite. In particular, the volume change due to the intercalation of lithium ions is smaller in $SiO_x$ than in Si, and application of $SiO_x$ to a negative electrode of lithium-ion batteries has been investigated. For example, Patent Literature 1 discloses a non-aqueous electrolyte secondary battery that contains a mixture of $SiO_x$ and graphite as a negative-electrode active material.

However, non-aqueous electrolyte secondary batteries that contain $SiO_x$ as a negative-electrode active material have lower initial charge/discharge efficiency than non-aqueous electrolyte secondary batteries that contain graphite as a negative-electrode active material. This is mainly because $SiO_x$ is converted into $Li_4SiO_4$ (an irreversible reactant) in an irreversible reaction during charging and discharging. Thus, in order to suppress such an irreversible reaction and improve initial charge/discharge efficiency, a negative-electrode active material represented by $SiLi_xO_y$ (0<x<1.0, 0<y<1.5) is proposed (see Patent Literature 2). Patent Literature 3 discloses a negative-electrode active material containing a lithium silicate phase composed mainly of $Li_4SiO_4$ in silicon oxide.

CITATION LIST

Patent Literature

PTL 1: Japanese Published Unexamined Patent Application No. 2011-233245
PTL 2: Japanese Published Unexamined Patent Application No. 2003-160328
PTL 3: Japanese Published Unexamined Patent Application No. 2007-59213

SUMMARY OF INVENTION

Technical Problem

The techniques disclosed in Patent Literature 2 and Patent Literature 3 are aimed at improving the initial charge/discharge efficiency by heat-treating a mixture of $SiO_x$ and a lithium compound at high temperature to convert $SiO_2$ into an irreversible reactant $Li_4SiO_4$ in advance. In these processes, however, $SiO_2$ remains within a particle, and $Li_4SiO_4$ is formed only on the particle surface. A reaction within the particle requires another high-temperature process, and this process will increase the crystal grain sizes of Si and $Li_4SiO_4$. Such an increased crystal grain size results in an increased volume change of active material particles due to charging and discharging and reduced lithium ion conductivity, for example.

Non-aqueous electrolyte secondary batteries are required not only to have high initial charge/discharge efficiency but also to suffer a smaller decrease in capacity due to the charge/discharge cycle. It is an object of the present disclosure to provide a negative-electrode active material for a non-aqueous electrolyte secondary battery containing a silicon material, wherein the negative-electrode active material has high initial charge/discharge efficiency and can constitute a non-aqueous electrolyte secondary battery having good cycle characteristics.

Solution to Problem

A negative-electrode active material for a non-aqueous electrolyte secondary battery according to one aspect of the present disclosure includes a lithium silicate phase represented by $Li_{2z}SiO_{(2+z)}$ {0<z<2} and silicon particles dispersed in the lithium silicate phase, wherein a lithium silicate constituting the lithium silicate phase has a crystallite size of 40 nm or less when calculated using the Scherrer equation from the half-width of a diffraction peak of a (111) plane of the lithium silicate in an XRD pattern obtained by XRD measurement.

A non-aqueous electrolyte secondary battery according to one aspect of the present disclosure includes a negative electrode containing the negative-electrode active material, a positive electrode, and a non-aqueous electrolyte.

Advantageous Effects of Invention

One aspect of the present disclosure can improve the initial charge/discharge efficiency and cycle characteristics of a non-aqueous electrolyte secondary battery that contains a silicon material as a negative-electrode active material.

DESCRIPTION OF EMBODIMENTS

Figure 1:
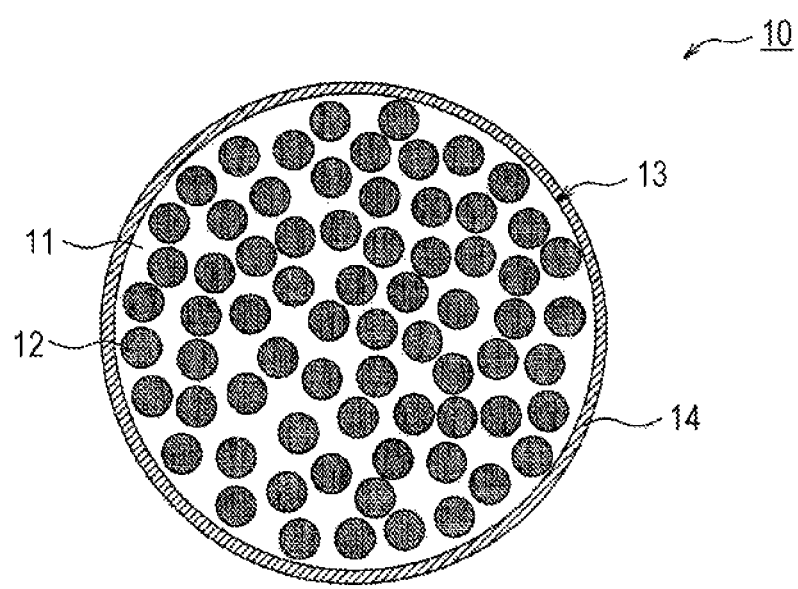
FIG. 1 is a schematic cross-sectional view of a negative-electrode active material according to an embodiment.

Embodiments of the present disclosure will be described in detail below. The drawings referred to in the embodiments are schematically illustrated, and the dimensions of constituents in the drawings may be different from the actual dimensions of the constituents. Specific dimensions should be determined in consideration of the following description.

A negative-electrode active material according to one embodiment of the present disclosure includes a lithium silicate phase represented by $Li_{2z}SiO_{(2+z)}$ (0<z<2) and silicon particles dispersed in the lithium silicate phase. Although the silicon particles may be covered with $SiO_2$ mostly in the form of a natural oxidation film, preferably, no diffraction peak of $SiO_2$ is observed at 2θ=25 degrees in an XRD pattern obtained by XRD measurement of a negative-electrode active material according to one embodiment of the present disclosure. $SiO_2$ in the form of a natural oxidation film is very different in characteristics from $SiO_2$ contained in known $SiO_x$ particles. For example, no diffraction peak of $SiO_2$ is observed at $2\theta=25$ degrees in an XRD pattern obtained by XRD measurement of a negative-electrode active material according to one embodiment of the present disclosure. This is probably because the natural oxidation film is very thin and cannot diffract X-rays. By contrast, a diffraction peak of $SiO_2$ is observed at $2\theta=25$ degrees in an XRD pattern of known $SiO_x$ particles.

In known $SiO_x$, fine Si particles are dispersed in a $SiO_2$ matrix, and the following reaction occurs during charging and discharging.

$$SiO_x(2Si+2SiO_2)+16Li^++16e^- \rightarrow 3Li_4Si+Li_4SiO_4 \quad (1)$$

The formula 1 is transformed into the following formulae in terms of Si and $2SiO_2$.

$$Si+4Li^++4e^- \rightarrow Li_4Si \quad (2)$$

$$2SiO_2+8Li^++8e^- \rightarrow Li_4Si+Li_4SiO_4 \quad (3)$$

As described above, the formula (3) is an irreversible reaction, and the formation of $Li_4SiO_4$ is primarily responsible for low initial charge/discharge efficiency.

A negative-electrode active material according to one embodiment of the present disclosure contains silicon particles dispersed in a lithium silicate phase represented by $Li_{2z}SiO_{(2+z)}$ ($0<z<2$) and has a much lower $SiO_2$ content than known $SiO_x$, for example. $SiO_2$ in the negative-electrode active material is a natural oxidation film and is very different in characteristics from $SiO_2$ contained in known $SiO_x$ particles. Thus, in a non-aqueous electrolyte secondary battery containing the negative-electrode active material, the reaction represented by the formula 3 is less likely to occur, and the initial charge/discharge efficiency is improved.

Although more lithium ions per unit volume can be intercalated into silicon materials, such as silicon oxides represented by $SiO_x$, than into carbon materials, such as graphite, as described above, the volume change associated with charging and discharging is greater in silicon materials than in graphite. In a negative-electrode active material according to one embodiment of the present disclosure, the lithium silicate phase around the silicon particles has a great influence on the cycle characteristics of the battery. The present inventors have found that a larger crystallite size of a lithium silicate constituting the lithium silicate phase makes it more difficult to reduce the volume change of the silicon particles associated with charging and discharging, makes it easier to disintegrate the lithium silicate phase, and makes it more likely that the cycle characteristics deteriorate. As a result, the present inventors have successfully and significantly improved the cycle characteristics by adjusting the crystallite size to be 40 nm or less.

In high-resistance materials like lithium silicates, lithium ions tend to move through crystal grain boundaries rather than through the interior of crystal grains. In other words, the crystal grain boundary path of lithium silicates has higher lithium ion conductivity than the path passing through crystal grains. The present inventors have improved the lithium ion conductivity of the lithium silicate phase by adjusting the crystallite size to be 40 nm or less to increase the crystal grain boundaries.

Improved lithium ion conductivity of the lithium silicate phase results in improved rate-limiting transfer of lithium ions to react the silicon particles, thereby making the electrochemical reaction of the silicon particles more uniform. Improved lithium ion conductivity of the lithium silicate phase also results in more uniform expansion and contraction of the silicon particles associated with charging and discharging, thereby possibly preventing force acting on the lithium silicate phase from being concentrated on a part of the lithium silicate phase. More specifically, the entire lithium silicate phase can reduce the volume change of the silicon particles and suppress the disintegration of the lithium silicate phase. Thus, a negative-electrode active material according to one embodiment of the present disclosure is less prone to the disintegration of the lithium silicate phase associated with charging and discharging, and a battery containing the negative-electrode active material has good cycle characteristics.

When a diffraction peak of a (111) plane of a lithium silicate has a half-width of 0.05 degrees or more, the lithium silicate phase is closer to amorphous, the interior of negative-electrode active material particles has higher lithium ion conductivity, and the volume change of the silicon particles associated with charging and discharging is further reduced.

A non-aqueous electrolyte secondary battery according to an embodiment includes a negative electrode containing the negative-electrode active material, a positive electrode, and a non-aqueous electrolyte containing a non-aqueous solvent. Preferably, a separator is disposed between the positive electrode and the negative electrode. A non-aqueous electrolyte secondary battery according to an embodiment includes an electrode assembly and a non-aqueous electrolyte in a housing. The electrode assembly includes a roll of a positive electrode and a negative electrode with a separator interposed therebetween. Alternatively, another electrode assembly, such as a layered electrode assembly, may be used instead of the wound electrode assembly. The layered electrode assembly includes a positive electrode and a negative electrode stacked with a separator interposed therebetween. The non-aqueous electrolyte secondary battery may be of any type, for example, of a cylindrical, square or rectangular, coin, button, or laminate type.

[Positive Electrode]

Preferably, the positive electrode includes a positive-electrode current collector, for example, formed of metal foil, and a positive-electrode mixture layer disposed on the current collector. The positive-electrode current collector can be formed of foil of a metal stable in the electric potential range of the positive electrode, such as aluminum, or a film having a surface layer formed of the metal. The positive-electrode mixture layer preferably contains an electrically conductive agent and a binder as well as a positive-electrode active material. The particles of the positive-electrode active material may be covered with fine particles of an oxide, such as aluminum oxide ($Al_2O_3$), or of an inorganic compound, such as a phosphoric acid compound or a boric acid compound.

The positive-electrode active material may be a lithium transition metal oxide containing at least one transition metal element, such as Co, Mn, and/or Ni. For example, the lithium transition metal oxide may be $Li_xCoO_2$, $Li_xNiO_2$, $Li_xMnO_2$, $Li_xCo_yNi_{1-y}O_2$, $Li_xCoM_{1-y}O_z$, $Li_xNi_{1-y}M_yO_4$, $Li_xMn_2O_4$, $Li_xMn_{2-y}M_yO_4$, $LiMPO_4$, or $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used alone or in combination.

The electrically conductive agent is used to increase the electrical conductivity of the positive-electrode mixture layer. The electrically conductive agent may be a carbon material, such as carbon black, acetylene black, ketjen black, or graphite. These may be used alone or in combination.

The binder is used to maintain good contact between the positive-electrode active material and the electrically conductive agent and improve the binding property of the positive-electrode active material on the surface of the positive-electrode current collector. The binder may be a fluoropolymer, such as polytetrafluoroethylene (PTFE) or poly(vinylidene fluoride) (PVdF), polyacrylonitrile (PAN), polyimide resin, acrylic resin, or polyolefin resin. These resins may be used in combination with carboxymethylcellulose (CMC) or a salt thereof (such as CMC-Na, CMC-K, or CMC-NH$_4$, or a partially neutralized salt thereof) or poly(ethylene oxide) (PEO). These may be used alone or in combination.

[Negative Electrode]

Preferably, the negative electrode includes a negative-electrode current collector, for example, formed of metal foil, and a negative-electrode mixture layer disposed on the current collector. The negative-electrode current collector can be formed of foil of a metal stable in the electric potential range of the negative electrode, such as copper, or a film having a surface layer formed of the metal. The negative-electrode mixture layer preferably contains a binder as well as a negative-electrode active material. As in the positive electrode, the binder can be a fluoropolymer, PAN, polyimide resin, acrylic resin, or polyolefin resin. In the preparation of a mixture slurry with an aqueous solvent, preferably used is CMC or a salt thereof (such as CMC-Na, CMC-K, or CMC-NH$_4$, or a partially neutralized salt thereof), styrene-butadiene rubber (SBR), poly(acrylic acid) (PAA) or a salt thereof (such as PAA-Na or PAA-K, or a partially neutralized salt thereof), or poly(vinyl alcohol) (PVA).

FIG. 1 is a cross-sectional view of a negative-electrode active material particle 10 according to an embodiment. As illustrated in FIG. 1, the negative-electrode active material particle 10 includes a lithium silicate phase 11 and silicon particles 12 dispersed in the phase. SiO$_2$ in the negative-electrode active material particle 10 is mostly in the form of a natural oxidation film. Preferably, no diffraction peak of SiO$_2$ is observed at 2θ=25 degrees in an XRD pattern obtained by XRD measurement of the negative-electrode active material particle 10. The lithium silicate phase 11 and the silicon particles 12 constitute a base particle 13, which is preferably covered with an electrically conductive layer 14.

The base particle 13 may contain a third component in addition to the lithium silicate phase 11 and the silicon particles 12. The amount of SiO$_2$, if any, in the form of a natural oxidation film contained in the base particle 13 is preferably less than 10% by mass, more preferably less than 7% by mass. A smaller size of the silicon particles 12 results in a larger surface area of the silicon particles 12 and more SiO$_2$ in the form of a natural oxidation film.

More lithium ions can be intercalated into the silicon particles 12 of the negative-electrode active material particle 10 than into carbon materials, such as graphite. Thus, use of the negative-electrode active material particles 10 in the negative-electrode active material contributes to increased capacity of the battery. The negative-electrode mixture layer may contain the negative-electrode active material particles 10 alone as a negative-electrode active material. However, since the volume change due to charging and discharging is greater in the silicon material than in graphite, another active material that suffers a smaller volume change due to charging and discharging may also be used to increase capacity while maintaining good cycle characteristics. The other active material is preferably a carbon material, such as graphite.

The graphite may be graphite conventionally used as a negative-electrode active material, for example, natural graphite, such as flake graphite, bulk graphite, or earthy graphite, or artificial graphite, such as massive artificial graphite (MAG) or graphitized mesophase carbon microbeads (MCMB). If graphite is used in combination, the mass ratio of the negative-electrode active material particles 10 to graphite preferably ranges from 1:99 to 30:70. At a mass ratio of the negative-electrode active material particles 10 to graphite within this range, both higher capacity and improved cycle characteristics can be more easily achieved. When the ratio of the negative-electrode active material particles 10 to graphite is less than 1% by mass, this reduces the advantages of the addition of the negative-electrode active material particles 10 to increase capacity.

The lithium silicate phase 11 is formed of a lithium silicate represented by Li$_{2z}$SiO$_{(2+z)}$ (0<z<2). In other words, Li$_4$SiO$_4$ (Z=2) does not constitute the lithium silicate phase 11. Li$_4$SiO$_4$ is an unstable compound, reacts with water and becomes alkaline, and thereby modifies Si and reduces charge/discharge capacity. The lithium silicate phase 11 is preferably composed mainly of Li$_2$SiO$_3$ (Z=1) or Li$_2$Si$_2$O$_5$ (Z=½) in terms of stability, manufacturability, and lithium ion conductivity. When Li$_2$SiO$_3$ or Li$_2$Si$_2$O$_5$ is a main component (a component with the largest mass), the main component content is preferably more than 50% by mass, more preferably 80% or more by mass, of the total mass of the lithium silicate phase 11.

The lithium silicate phase 11 is preferably composed of fine particles. For example, the lithium silicate phase 11 is composed of particles finer than the silicon particles 12. The lithium silicate particles constituting the lithium silicate phase 11 may be composed of a single crystallite or a plurality of crystallites. In an XRD pattern of the negative-electrode active material particle 10, for example, the diffraction peak intensity of the Si (111) plane is higher than the diffraction peak intensity of the (111) plane of a lithium silicate. In other words, the integrated diffraction peak intensity of the (111) plane of the lithium silicate phase 11 is lower than the integrated diffraction peak intensity of the Si (111) plane. When the Si (111) plane has a higher diffraction peak intensity than the (111) plane of a lithium silicate, this results in a smaller number of crystals and lower hardness. Thus, the silicon particles 12 can more easily withstand the expansion and contraction of silicon due to charging and discharging, and the cycle characteristics are further improved.

A lithium silicate constituting the lithium silicate phase 11 has a crystallite size of 40 nm or less, preferably 35 nm or less, more preferably 30 nm or less, particularly preferably 25 nm or less. A crystallite size of 40 nm or less results in more uniform volume changes of the silicon particles 12 associated with charging and discharging, as described above. Thus, the lithium silicate phase 11 is less prone to disintegration, thus achieving good cycle characteristics. The lower limit of the crystallite size is, but not limited to, 5 nm, for example.

The crystallite size of a lithium silicate is calculated using the Scherrer equation from the half-width of a diffraction peak of the (111) plane of the lithium silicate in an XRD pattern obtained by XRD measurement of the negative-electrode active material particle 10. The specific measurement conditions for the crystallite size are described below.

Measuring apparatus: multipurpose X-ray diffraction system Ultima IV (manufactured by Rigaku Corporation)

Analysis software: integrated X-ray powder diffraction software PDXL (available from Rigaku Corporation)

Measurement conditions: 20 to 90 degrees, using the diffraction peak (2θ=26 to 27 degrees) of the (111) plane of a lithium silicate, peak top 5000 counts or more Anticathode: Cu—Kα
Tube current/voltage: 40 mA/40 kv
Counting time: 1.0 s
Divergence slit: 2/3 degrees
Divergence height-limiting slit: 10 mm
Scattering slit: 2/3 degrees
Light-receiving slit: 0.3 mm
Sample rotation: 60 rpm The negative-electrode active material particles 10 after charging and discharging preferably contain no $Li_4SiO_4$. Since $SiO_2$ in the starting material of the negative-electrode active material particles 10 is mostly in the form of a natural oxidation film, the reaction represented by the formula (3) is less likely to occur in initial charging and discharging, and the irreversible reactant $Li_4SiO_4$ is negligibly formed.

Preferably, the silicon particles 12 are almost uniformly dispersed in the lithium silicate phase 11. For example, the negative-electrode active material particle 10 (the base particle 13) has a sea-island structure in which fine silicon particles 12 are dispersed in a lithium silicate matrix, and the silicon particles 12 are not localized in a particular region and are almost uniformly distributed in any cross section of the negative-electrode active material particle 10 (the base particle 13). The amount of the silicon particles 12 (Si) in the base particle 13 preferably ranges from 20% to 95% by mass, more preferably 35% to 75% by mass, of the total mass of the base particle 13 in terms of higher capacity and improved cycle characteristics. An excessively low Si content may result in decreased charge/discharge capacity and poor load characteristics due to insufficient diffusion of lithium ions. An excessively high Si content may cause deterioration of cycle characteristics because part of Si is not covered with a lithium silicate, and exposed Si comes into contact with an electrolyte solution.

The silicon particles 12 may have an average particle size of 500 nm or less, preferably 200 nm or less, more preferably 50 nm or less, before initial charging. After charging and discharging, 400 nm or less is preferred, and 100 nm or less is more preferred. A decrease in the size of the silicon particles 12 results in a smaller volume change during charging and discharging and makes it easier to suppress the disintegration of the electrode structure. The average particle size of the silicon particles 12 is determined by observing a cross section of the negative-electrode active material particle 10 with a scanning electron microscope (SEM) or a transmission electron microscope (TEM). More specifically, the average particle size of the silicon particles 12 is determined by averaging the longest diameters of 100 of the silicon particles 12.

In the negative-electrode active material particle 10 (the base particle 13), a diffraction peak of a (111) plane of a lithium silicate in an XRD pattern obtained by XRD measurement has a half-width of 0.05 degrees or more. As described above, when the half-width is adjusted to be 0.05 degrees or more, the lithium silicate phase has lower crystallinity, the interior of the particles has higher lithium ion conductivity, and the volume change of the silicon particles 12 associated with charging and discharging is further reduced. The preferred half-width of a diffraction peak of a (111) plane of a lithium silicate depends partly on the components of the lithium silicate phase 11 and is more preferably 0.09 degrees or more, for example, 0.09 to 0.55 degrees, particularly preferably 0.09 to 0.30 degrees.

The half-width of a diffraction peak of a (111) plane of a lithium silicate is determined under the following conditions. In the presence of a plurality of lithium silicates, the half-width (degrees (2θ)) of the peak of the (111) plane of each lithium silicate is determined. When a diffraction peak of a (111) plane of a lithium silicate overlapped the diffraction peak of other Miller indices or the diffraction peak of another substance, the half-width of the diffraction peak of the (111) plane of the lithium silicate was measured after isolated.

Measuring apparatus: X-ray diffractometer (Model: RINT-TTRII) manufactured by Rigaku Corporation
Anticathode: Cu
Tube voltage: 50 kv
Tube current: 300 mA
Optical system: parallel beam method
[Incident side: multilayer film mirror (angle of divergence: 0.05 degrees, beam width: 1 mm), Soller slits (5 degrees), Light-receiving side: long slits PSA200 (resolution: 0.057 degrees), Soller slits (5 degrees)]
Scan step: 0.01 or 0.02 degrees
Counting time: 1 to 6 seconds When the lithium silicate phase 11 is composed mainly of $Li_2Si_2O_5$, the half-width of the diffraction peak of the (111) plane of $Li_2Si_2O_5$ in an XRD pattern of the negative-electrode active material particle 10 is preferably 0.09 degrees or more. For example, when $Li_2Si_2O_5$ constitutes 80% or more by mass of the total mass of the lithium silicate phase 11, the diffraction peak has a preferred half-width in the range of 0.09 to 0.55 degrees. When the lithium silicate phase 11 is composed mainly of $Li_2SiO_3$, the half-width of the diffraction peak of (111) of $Li_2SiO_3$ in an XRD pattern of the negative-electrode active material particle 10 is preferably 0.10 degrees or more.

For example, when $Li_2SiO_3$ constitutes 80% or more by mass of the total mass of the lithium silicate phase 11, the diffraction peak preferably has a half-width in the range of 0.10 to 0.55 degrees, more preferably 0.10 to 0.30 degrees.

The negative-electrode active material particles 10 preferably have an average particle size in the range of 1 to 15 μm, more preferably 4 to 10 μm, in terms of higher capacity and improved cycle characteristics. The average particle size of the negative-electrode active material particles 10 is the size of primary particles and refers to the particle size at which the integrated volume is 50% in the particle size distribution measured by a laser diffraction scattering method (for example, with "LA-750" manufactured by Horiba, Ltd.) (the volume-average particle size). When the negative-electrode active material particles 10 have an excessively small average particle size, this tends to result in decreased capacity due to an increased surface area and an enhanced reaction with an electrolyte. On the other hand, when the negative-electrode active material particles 10 have an excessively large average particle size, this tends to result in an increased volume change due to charging and discharging and the deterioration of cycle characteristics. Although the negative-electrode active material particle 10 (the base particle 13) is preferably covered with the electrically conductive layer 14, the electrically conductive layer 14 has a small thickness and has little effect on the average particle size of the negative-electrode active material particle 10 (the particle size of the negative-electrode active material particle 10 is almost equal to the particle size of the base particle 13).

The base particles 13 can be manufactured through the following steps 1 to 3, for example. These steps are performed in an inert atmosphere.

(1) A ground Si powder and a ground lithium silicate powder each having an average particle size in the range of several to tens of micrometers are mixed, for example, at a weight ratio in the range of 20:80 to 95:5 to prepare a mixture.

(2) The mixture is then ground in a ball mill for micronization. Alternatively, their raw powders subjected to micronization in advance may be used to prepare the mixture.

(3) The ground mixture is heat-treated at a temperature in the range of 600° C. to 1000° C., for example. In the heat treatment, the mixture may be pressed, for example, by hot pressing to form a sintered body. Lithium silicates represented by $Li_{2z}SiO_{(2+z)}$ ($0<z<2$) are stable in this temperature range and do not react with Si. Thus, the capacity is not decreased. Alternatively, Si nanoparticles and lithium silicate nanoparticles may be synthesized without a ball mill and may be mixed and heat-treated to prepare the base particles 13.

The negative-electrode active material particle 10 preferably includes the electrically conductive layer 14 on its surface. The electrically conductive layer 14 is formed of a material having higher electrical conductivity than the lithium silicate phase 11 surrounding the silicon particles 12. The electrically conductive agent of the electrically conductive layer 14 is preferably electrochemically stable and is preferably at least one selected from the group consisting of carbon materials, metals, and metallic compounds. As in the electrically conductive agent in the positive-electrode mixture layer, the carbon materials may be carbon black, acetylene black, ketjen black, graphite, and a mixture of at least two of these materials. The metals may be copper, nickel, and alloys thereof that are stable in the electric potential range of the negative electrode. The metallic compounds may be copper compounds and nickel compounds (a metal or metallic compound layer can be formed on the base particle 13, for example, by electroless plating). Among these, the carbon materials are particularly preferred.

A method for covering the base particles 13 with carbon may be a CVD method using acetylene and/or methane or a method of mixing coal pitch, petroleum pitch, and/or a phenolic resin with the base particles 13 and heat-treating the mixture. Alternatively, carbon black and/or ketjen black may be adhered to the base particles 13 with a binder to form a carbon covering layer.

The electrically conductive layer 14 preferably almost entirely covers the base particle 13. The electrically conductive layer 14 preferably has a thickness in the range of 1 to 200 nm, more preferably 5 to 100 nm, in terms of electrical conductivity and the diffusion of lithium ions in the base particle 13. The electrically conductive layer 14 having an excessively small thickness has lower electrical conductivity and has difficulty in uniformly covering the base particle 13. On the other hand, the electrically conductive layer 14 having an excessively large thickness tends to prevent the diffusion of lithium ions into the base particle 13 and decrease capacity. The thickness of the electrically conductive layer 14 can be determined by the cross-sectional observation of particles with SEM or TEM.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolytic solution) and may be a solid electrolyte containing a gel polymer. The non-aqueous solvent may be an ester, ether, nitrile, such as acetonitrile, amide, such as dimethylformamide, or a mixed solvent of at least two of these solvents. The non-aqueous solvent may contain a halogen substitution product of these solvents, in which at least part of hydrogens of the solvents are substituted with a halogen atom, such as fluorine.

Examples of the ester include cyclic carbonates, such as ethylene carbonate (EC), propylene carbonate (PC), and butylene carbonate, chain carbonates, such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylates, such as γ-butyrolactone (GBL) and γ-valerolactone (GVL), and chain carboxylates, such as methyl acetate, ethyl acetate, propyl acetate, methyl propionate (MP), ethyl propionate, and γ-butyrolactone.

Examples of the ether include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The halogen substitution product is preferably a fluorinated cyclic carbonate, such as fluoroethylene carbonate (FEC), a fluorinated chain carbonate, or a fluorinated chain carboxylate, such as fluoropropionic acid methyl (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lower aliphatic carboxylic acid lithium, borates, such as $Li_2B_4O_7$ and $Li(B(C_2O_4)F_2)$, and imide salts, such as $LiN(SO_2CF_3)_2$ and $LiN(C_lF_{2l+1}SO_2)(C_mF_{2m+1}SO_2)$ {l and m are integers of 1 or more}. These lithium salts may be used alone or in combination. Among these, $LiPF_6$ is preferred in terms of ionic conductivity and electrochemical stability. The concentration of lithium salt preferably ranges from 0.8 to 1.8 moles per liter of the non-aqueous solvent.

[Separator]

The separator may be an ion-permeable insulating porous sheet. Specific examples of the porous sheet include microporous thin films, woven fabrics, and nonwoven fabrics. The material of the separator is preferably an olefin resin, such as polyethylene or polypropylene, or cellulose. The separator may be a laminate of a cellulose fiber layer and a thermoplastic fiber layer, such as an olefin resin.

EXAMPLES

Although the present disclosure will be further described in the following examples, the present disclosure is not limited to these examples.

Example 1

[Production of Negative-Electrode Active Material]

A Si powder (3N, 10 μm ground product) and a $Li_2SiO_3$ powder (10 μm ground product) were mixed at a mass ratio of 42:58 in an inert atmosphere and were charged into a pot (made of SUS, volume: 500 mL) of a planetary ball mill (P-5 manufactured by Fritsch). The pot was charged with 24 balls made of SUS (diameter: 20 mm) and was closed. The mixed powder was ground at 200 rpm for 50 hours. The powder was then removed in an inert atmosphere and was heat-treated at a temperature of 600° C. in an inert atmosphere for 4 hours. The heat-treated powder (hereinafter referred to as base particles) was ground, was passed through a 40-µm mesh sieve, was mixed with coal pitch (MCP250 manufactured by JFE Chemical Corporation), and was heat-treated at a temperature of 800° C. in an inert atmosphere for 5 hours to be covered with carbon, thus forming an electrically conductive layer. The carbon coverage was 5% by mass of the total mass of the particles each containing the base particle and the electrically conductive layer. The average particle size was adjusted to be 5 µm with a sieve. Thus, a negative-electrode active material A1 was produced.

[Analysis of Negative-Electrode Active Material]

Figure 2:
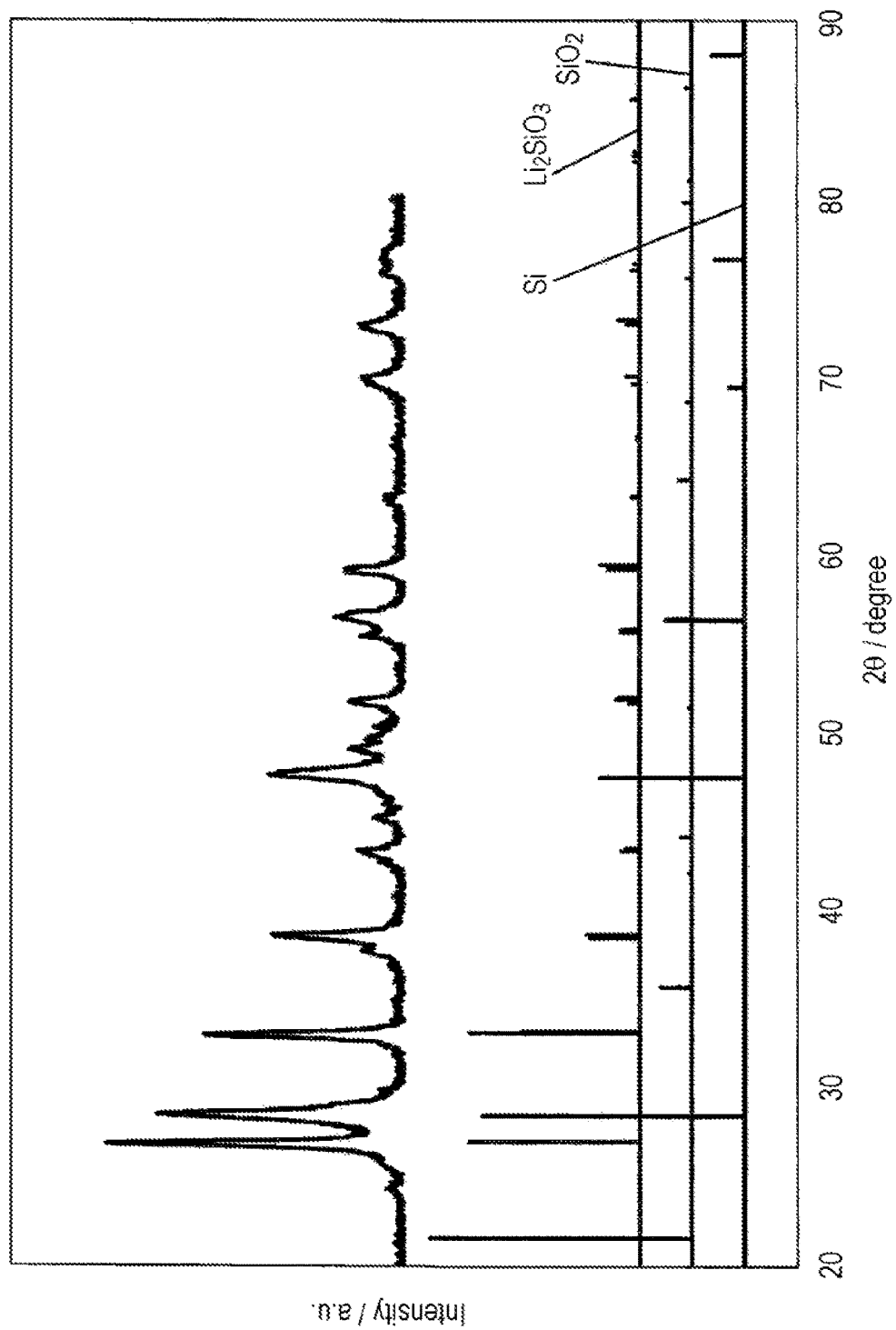
FIG. 2 is an XRD pattern of a cross section of a particle in a negative-electrode active material according to an embodiment (a negative-electrode active material A1 according to Example 1).

A SEM observation of a cross section of particles of the negative-electrode active material A1 showed that Si particles had an average particle size of less than 100 nm. It was also shown that Si particles were almost uniformly dispersed in a $Li_2SiO_3$ matrix. FIG. 2 shows an XRD pattern of the negative-electrode active material A1. diffraction peaks mainly attributed to Si and $Li_2SiO_3$ were observed in the XRD pattern of the negative-electrode active material A1. The crystallite size of $Li_2SiO_3$ was 35 nm when calculated using the Scherrer equation from the half-width (0.233 degrees) of the diffraction peak (2θ=approximately 27 degrees) of the (111) plane of $Li_2SiO_3$ in the XRD pattern under the measurement conditions. No diffraction peak of $SiO_2$ was observed at 2θ=25 degrees. A Si-NMR measurement of the negative-electrode active material A1 under the following conditions showed that the $SiO_2$ content was less than 7% by mass (below the minimum limit of detection), and no peak of $Li_4SiO_4$ was detected.

<Si-NMR Measurement Conditions>

Measuring apparatus: solid-state nuclear magnetic resonance spectrometer (INOVA-400) manufactured by Varian Inc.

Probe: Varian 7-mm CPMAS-2

MAS: 4.2 kHz

MAS rate: 4 kHz

Pulse: DD (45-degree pulse+signal acquisition time 1H decoupling)

Repetition time: 1200 seconds

Observation width: 100 kHz

Center of observation: approximately −100 ppm

Signal acquisition time: 0.05 seconds

Number of scans: 560

Sample weight: 207.6 mg

[Preparation of Negative Electrode]

The negative-electrode active material and polyacrylonitrile (PAN) were then mixed at a mass ratio of 95:5. After N-methyl-2-pyrrolidone (NMP) was added to the mixture, the mixture was stirred in a mixer (Thinky Mixer manufactured by Thinky Corporation) to prepare a negative-electrode mixture slurry. The slurry was then applied to one side of a copper foil such that the mass of the negative-electrode mixture layer was 25 g/m², was dried in air at 105° C., and was rolled. Thus, a negative electrode was prepared. The negative-electrode mixture layer had a density of 1.50 g/cm³.

[Preparation of Non-Aqueous Electrolytic Solution]

Ethylene carbonate (EC) and diethyl carbonate (DEC) were mixed at a volume ratio of 3:7. $LiPF_6$ was added to this mixed solvent such that the concentration of $LiPF_6$ was 1.0 mol/L. Thus, a non-aqueous electrolytic solution was prepared.

[Manufacture of Non-Aqueous Electrolyte Secondary Battery]

In an inert atmosphere, the negative electrode and a lithium metal foil each having a Ni tab were oppositely disposed with a polyethylene separator interposed therebetween to prepare an electrode assembly. The electrode assembly was placed in a battery housing formed of an aluminum laminated film. The non-aqueous electrolytic solution was poured into the battery housing, and the battery housing was sealed. Thus, a battery T1 was manufactured.

Example 2

A negative-electrode active material A2 and a battery T2 were manufactured in the same manner as in Example 1 except that the processing time in the ball mill was 150 hours. diffraction peaks mainly attributed to Si and $Li_2SiO_3$ were observed in an XRD pattern of the negative-electrode active material A2. The crystallite size of $Li_2SiO_3$ was 21 nm when calculated using the Scherrer equation from the half-width (0.401 degrees) of the diffraction peak of the (111) plane of $Li_2SiO_3$. No diffraction peak of $SiO_2$ was observed at 2θ=25 degrees. A Si-NMR measurement of the negative-electrode active material A2 showed that the $SiO_2$ content was less than 7% by mass (below the minimum limit of detection), and no peak of $Li_4SiO_4$ was detected.

Example 3

A negative-electrode active material A3 and a battery T3 were manufactured in the same manner as in Example 1 except that $Li_2SiO_3$ was replaced with $Li_2Si_2O_5$. diffraction peaks mainly attributed to Si and $Li_2Si_2O_5$ were observed in an XRD pattern of the negative-electrode active material A3. The crystallite size of $Li_2Si_2O_5$ was 20 nm when calculated using the Scherrer equation from the half-width (0.431 degrees) of the diffraction peak of the (111) plane of $Li_2Si_2O_5$. No diffraction peak of $SiO_2$ was observed at 2θ=25 degrees. A Si-NMR measurement of the negative-electrode active material A3 showed that the $SiO_2$ content was less than 7% by mass (below the minimum limit of detection), and no peak of $Li_4SiO_4$ was detected.

Comparative Example 1

A negative-electrode active material B1 and a battery R1 were manufactured in the same manner as in Example 1 except that the processing conditions for the ball mill included 50 rpm and 50 hours. diffraction peaks mainly attributed to Si and $Li_2SiO_3$ were observed in the XRD pattern of the negative-electrode active material B1. The crystallite size of $Li_2SiO_3$ was 200 nm when calculated using the Scherrer equation from the half-width (0.042 degrees) of the diffraction peak of the (111) plane of Li$_2$SiO$_3$. No diffraction peak of SiO$_2$ was observed at 2θ=25 degrees. A Si-NMR measurement of the negative-electrode active material B1 showed that the SiO$_2$ content was less than 7% by mass (below the minimum limit of detection), and no peak of Li$_4$SiO$_4$ was detected.

Reference Example 1

SiO$_x$ (x=0.97, average particle size: 5 μm) and coal pitch were mixed and were heat-treated in an inert atmosphere at 800° C. to produce SiO$_x$ covered with a carbon covering layer. Thus, a negative-electrode active material C1 was prepared. A battery S1 was manufactured in the same manner as in Example 1 except that the negative-electrode active material A1 was replaced with the negative-electrode active material C1.

The batteries of Examples 1 to 3, Comparative Example 1, and Reference Example 1 were evaluated in terms of initial charge/discharge efficiency by the following method. Table 1 shows the evaluation results.

[Evaluation of Initial Charge/Discharge Efficiency]

Charging

Constant-current charging at an electric current of 0.2 It to a voltage of 0 V was followed by constant-current charging at an electric current of 0.05 It to a voltage of 0 V.

Discharging

Constant-current discharging was performed at an electric current of 0.2 It to a voltage of 1.0 V.

Rest

The rest period between the charging and discharging was 10 minutes.

The ratio of discharge capacity to charge capacity in the first cycle was considered to be initial charge/discharge efficiency.

Initial charge/discharge efficiency (%)=discharge capacity in first cycle/charge capacity in first cycle×100

[NMR Measurement of Negative-Electrode Active Material Particles after Charging and Discharging]

Figure 3:
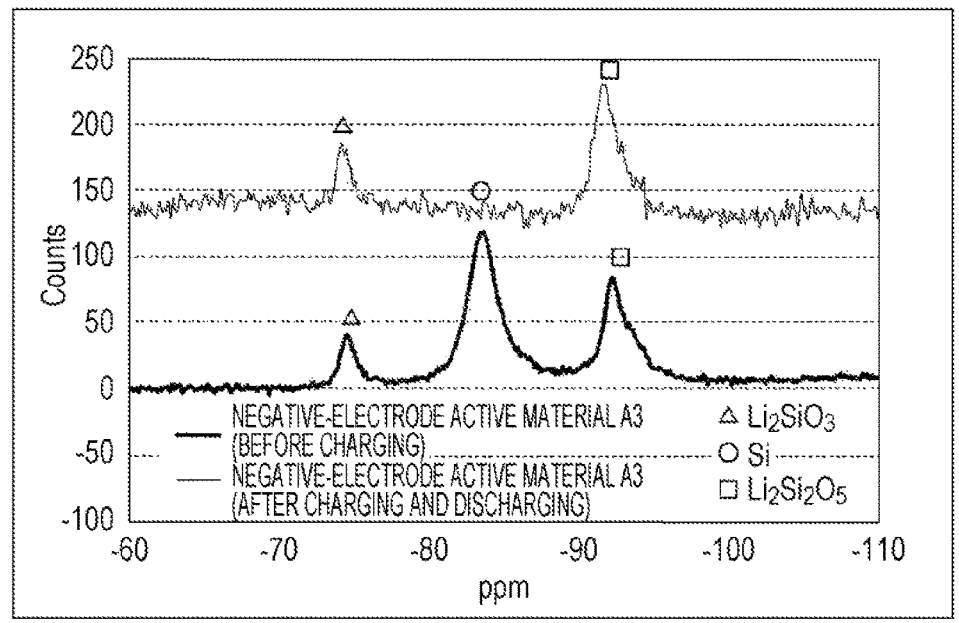
FIG. 3 is a Si-NMR spectrum of a negative-electrode active material according to an embodiment (a negative-electrode active material A3 according to Example 3).
Figure 4:
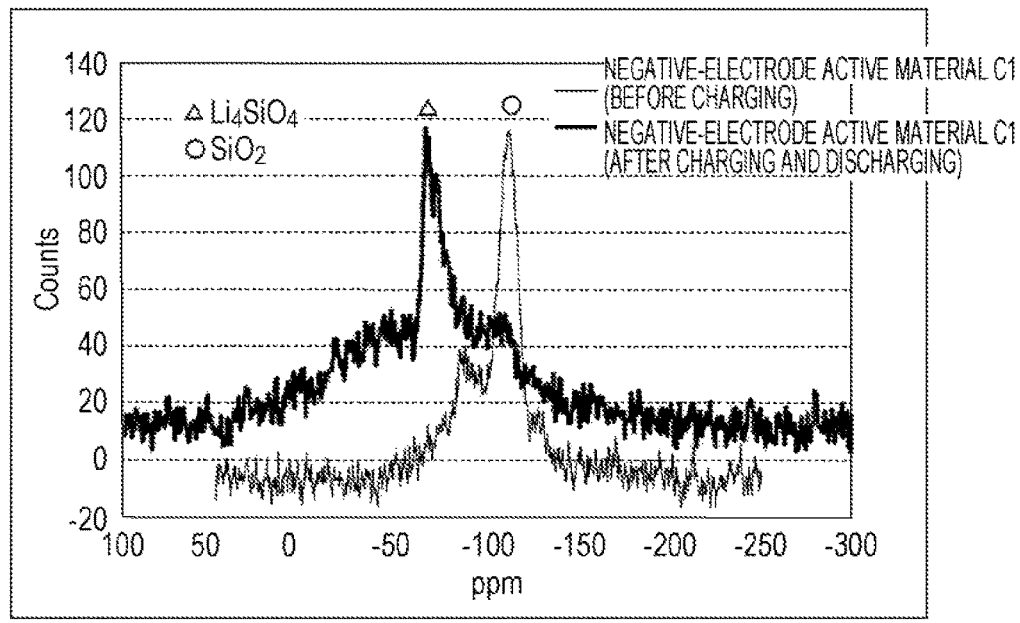
FIG. 4 is a Si-NMR spectrum of $SiO_x$.

After one cycle of charging and discharging, the battery was disassembled in an inert atmosphere. Only the negative-electrode active material was removed from the electrode plate and was used as an NMR measurement sample. After one cycle of charging and discharging, the negative-electrode active materials A1 to A3, B1, and C1 were subjected to Si-NMR measurement under the conditions described above. FIG. 3 shows the Si-NMR results of the negative-electrode active material A3 before and after initial charging and discharging. FIG. 4 shows the Si-NMR results of the negative-electrode active material C1 before and after initial charging and discharging. As shown in FIG. 3, no peak of Li$_4$SiO$_4$ was detected in the NMR spectrum of the negative-electrode active material A3 after charging and discharging (as described above, the same is true for the negative-electrode active materials A1, A2, and B1 after charging and discharging). By contrast, as shown in FIG. 4, a peak of Li$_4$SiO$_4$ was detected in the NMR spectrum of the negative-electrode active material C1 after charging and discharging.

TABLE 1

|  | Grinding conditions | Li silicate type | Li silicate half-width | Crystallite size (nm) | Initial charge/discharge efficiency (%) |
| --- | --- | --- | --- | --- | --- |
| Example 1 | 200 rpm, 50 h | Li$_2$SiO$_3$ | 0.233 | 35 | 79 |
| Example 2 | 200 rpm, 150 h |  | 0.401 | 21 | 82 |
| Example 3 | 200 rpm, 50 h | Li$_2$Si$_2$O$_5$ | 0.431 | 20 | 82 |
| Comparative example 1 | 50 rpm, 50 h | Li$_2$SiO$_3$ | 0.042 | 200 | 61 |
| Reference example |  | — | — | — | 60 |

Table 1 shows that the batteries T1 to T3 of the examples had higher initial charge/discharge efficiency than the battery R1 of Comparative Example 1 and the battery S1 of Reference Example 1.

Example 4

[Preparation of Positive Electrode]

Lithium cobalt oxide, acetylene black (HS100 manufactured by Denki Kagaku Kogyo K.K.), and poly(vinylidene fluoride) (PVdF) were mixed at a mass ratio of 95:2.5:2.5. A dispersion medium N-methyl-2-pyrrolidone (NMP) was added to the mixture. The mixture was stirred in a mixer (T. K. Hivis Mix manufactured by Primix Corporation) to prepare a positive-electrode mixture slurry. The positive-electrode mixture slurry was then applied to an aluminum foil, was dried, and was rolled with rolling rollers to prepare a positive electrode, which included a positive-electrode mixture layer having a density of 3.6 g/cm$^3$ on each side of the aluminum foil.

[Preparation of Negative Electrode]

The negative-electrode active material A1 used in Example 1 and graphite were mixed at a mass ratio of 5:95 and were used as a negative-electrode active material A4 (negative-electrode active material A1: 5% by mass). The negative-electrode active material A4, sodium carboxymethylcellulose (CMC-Na), and styrene-butadiene rubber (SBR) were mixed at a mass ratio of 97.5:1.0:1.5. Water was added to the mixture. The mixture was stirred in a mixer (T. K. Hivis Mix manufactured by Primix Corporation) to prepare a negative-electrode mixture slurry. The slurry was then applied to a copper foil such that the mass of the negative-electrode mixture layer was 190 g/m$^2$, was dried in air at 105° C., and was rolled to prepare a negative electrode, which included a negative-electrode mixture layer having a density of 1.6 g/cm$^3$ on each side of the copper foil.

[Manufacture of Non-Aqueous Electrolyte Secondary Battery]

A tab was attached to each of the electrodes. The positive electrode and the negative electrode each having the tab were wound with a separator interposed therebetween such that the tabs were located on the outermost periphery, thus forming a wound electrode assembly. The electrode assembly was inserted into a housing formed of an aluminum laminate sheet and was dried under vacuum at 105° C. for 2 hours. The non-aqueous electrolytic solution was then poured into the housing, and the opening of the housing was sealed. Thus, a battery T4 was manufactured. The battery has a design capacity of 800 mAh.

Example 5

A negative-electrode active material A5 and a battery T5 were manufactured in the same manner as in Example 4 except that the negative-electrode active material A1 was replaced with the negative-electrode active material A2.

Example 6

A negative-electrode active material A6 and a battery T6 were manufactured in the same manner as in Example 4 except that the negative-electrode active material A1 was replaced with the negative-electrode active material A3.

Example 7

A negative-electrode active material A7 was produced in the same manner as in Example 3 except that the processing time in the ball mill was 30 hours. diffraction peaks mainly attributed to Si and $Li_2Si_2O_5$ were observed in an XRD pattern of the negative-electrode active material A7. The crystallite size of $Li_2Si_2O_5$ was 39 nm when calculated using the Scherrer equation from the half-width (0.219 degrees) of the diffraction peak of the (111) plane of $Li_2Si_2O_5$. No diffraction peak of $SiO_2$ was observed at 2θ=25 degrees. A Si-NMR measurement of the negative-electrode active material A7 showed that the $SiO_2$ content was less than 7% by mass (below the minimum limit of detection), and no peak of $Li_4SiO_4$ was detected. A negative-electrode active material and a battery T7 were manufactured in the same manner as in Example 4 except that the negative-electrode active material A1 was replaced with the negative-electrode active material A7.

Comparative Example 2

A negative-electrode active material B2 was produced in the same manner as in Example 1 except that the processing time in the ball mill was 25 hours. diffraction peaks mainly attributed to Si and $Li_2SiO_3$ were observed in the XRD pattern of the negative-electrode active material B2. The crystallite size of $Li_2SiO_3$ was 49 nm when calculated using the Scherrer equation from the half-width (0.175 degrees) of the diffraction peak of the (111) plane of $Li_2SiO_3$. No diffraction peak of $SiO_2$ was observed at 2θ=25 degrees. A Si-NMR measurement of the negative-electrode active material B2 showed that the $SiO_2$ content was less than 7% by mass (below the minimum limit of detection), and no peak of $Li_4SiO_4$ was detected. A negative-electrode active material and a battery R2 were manufactured in the same manner as in Example 4 except that the negative-electrode active material A1 was replaced with the negative-electrode active material B2.

Comparative Example 3

A negative-electrode active material B3 was produced in the same manner as in Example 3 except that the processing time in the ball mill was 25 hours. diffraction peaks mainly attributed to Si and $Li_2Si_2O_5$ were observed in an XRD pattern of the negative-electrode active material B3. The crystallite size of $Li_2Si_2O_5$ was 44 nm when calculated using the Scherrer equation from the half-width (0.186 degrees) of the diffraction peak of the (111) plane of $Li_2Si_2O_5$. No diffraction peak of $SiO_2$ was observed at 2θ=25 degrees. A Si-NMR measurement of the negative-electrode active material B3 showed that the $SiO_2$ content was less than 7% by mass (below the minimum limit of detection), and no peak of $Li_4SiO_4$ was detected. A negative-electrode active material and a battery R3 were manufactured in the same manner as in Example 4 except that the negative-electrode active material A1 was replaced with the negative-electrode active material B3.

Comparative Example 4

A negative-electrode active material B4 and a battery R4 were manufactured in the same manner as in Example 4 except that the negative-electrode active material A1 was replaced with the negative-electrode active material B1 used in Comparative Example 1.

The charge/discharge cycle characteristics of the batteries of Examples 4 to 7 and Comparative Examples 2 to 4 and the appearance of the negative-electrode active material particles A1 to A3, A7, and B1 to B3 were evaluated by the following methods. Table 2 shows the evaluation results.

[Cycle Test]

The cycle test of the batteries was performed under the charge/discharge conditions described above. The number of cycles at which the discharge capacity reached 80% of the discharge capacity of the first cycle was determined as cycle life. The cycle life of each battery is the relative value based on the cycle life of the battery R2, which is taken as 100.

[Evaluation of Appearance of Negative-Electrode Active Material Particles (Check for Particle Disintegration)]

After the cycle test was finished, the battery was disassembled in an inert atmosphere. A negative electrode was removed from the disassembled battery. A cross section of the negative-electrode active materials (A1 to A3, A7, and B1 to B3) was exposed in an inert atmosphere with a cross-section polisher (manufactured by JEOL Ltd.) and was observed with a SEM to check for particle disintegration. Particle disintegration means that one particle in the cross section is broken into two or more fine particles.

TABLE 2

|  | Grinding time (h) | Li silicate type | Li silicate half-width | Crystallite size (nm) | Cycle life | Particle disintegration |
|---|---|---|---|---|---|---|
| Example 4 | 200 rpm, 50 h | $Li_2SiO_3$ | 0.233 | 35 | 111 | None |
| Example 5 | 200 rpm, 150 h |  | 0.401 | 21 | 117 | None |
| Example 6 | 200 rpm, 50 h | $Li_2Si_2O_5$ | 0.431 | 20 | 111 | None |
| Example 7 | 200 rpm, 30 h |  | 0.219 | 39 | 107 | None |

TABLE 2-continued

| | Grinding time (h) | Li silicate type | Li silicate half-width | Crystallite size (nm) | Cycle life | Particle disintegration |
|---|---|---|---|---|---|---|
| Comparative example 2 | 200 rpm, 25 h | $Li_2SiO_3$ | 0.175 | 49 | 100 | Observed |
| Comparative example 3 | 200 rpm, 25 h | $Li_2Si_2O_5$ | 0.186 | 44 | 99 | Observed |
| Comparative example 4 | 50 rpm, 50 h | $Li_2SiO_3$ | 0.042 | 200 | 76 | Observed |

Table 2 shows that particle disintegration due to charging and discharging occurs less frequently in the negative-electrode active materials A1 to A3 and A7 of the examples than in the negative-electrode active materials B1 to B3 of the comparative examples. The batteries T4 to T7 containing the negative-electrode active materials A1 to A3 and A7 have a longer cycle life and better cycle characteristics than the batteries R2 to R4 containing the negative-electrode active materials B1 to B3.

REFERENCE SIGNS LIST 10 negative-electrode active material particle, 11 lithium silicate phase, 12 silicon particles, 13 base particle, 14 electrically conductive layer.

The invention claimed is:

1. A negative-electrode active material for a non-aqueous electrolyte secondary battery, comprising:
   a lithium silicate phase represented by $Li_{2z}SiO_{(2+z)}$ {$0<z<2$} and
   silicon particles dispersed in the lithium silicate phase,
   wherein a lithium silicate constituting the lithium silicate phase has a crystallite size of 40 nm or less when calculated using a Scherrer equation from a half-width of a diffraction peak of a (111) plane of the lithium silicate in an XRD pattern obtained by XRD measurement,
   wherein the negative-electrode active material for the non-aqueous electrolyte secondary battery after charging and discharging contains no $Li_4SiO_4$.

2. The negative-electrode active material for a non-aqueous electrolyte secondary battery according to claim 1, wherein the Si (111) plane has a higher diffraction peak intensity than a (111) plane of the lithium silicate in the XRD pattern obtained by XRD measurement.

3. The negative-electrode active material for a non-aqueous electrolyte secondary battery according to claim 1, wherein no diffraction peak of $SiO_2$ is observed at 2θ=25 degrees in the XRD pattern.

4. The negative-electrode active material for a non-aqueous electrolyte secondary battery according to claim 2, wherein no diffraction peak of $SiO_2$ is observed at 2θ=25 degrees in the XRD pattern.

5. The negative-electrode active material for a non-aqueous electrolyte secondary battery according to claim 1, wherein the lithium silicate phase is composed mainly of $Li_2Si_2O_5$, and a diffraction peak of a (111) plane of the $Li_2Si_2O_5$ in the XRD pattern has a half-width of 0.09 degrees or more.

6. The negative-electrode active material for a non-aqueous electrolyte secondary battery according to claim 2, wherein the lithium silicate phase is composed mainly of $Li_2Si_2O_5$, and a diffraction peak of a (111) plane of the $Li_2Si_2O_5$ in the XRD pattern has a half-width of 0.09 degrees or more.

7. The negative-electrode active material for a non-aqueous electrolyte secondary battery according to claim 3, wherein the lithium silicate phase is composed mainly of $Li_2Si_2O_5$, and a diffraction peak of a (111) plane of the $Li_2Si_2O_5$ in the XRD pattern has a half-width of 0.09 degrees or more.

8. The negative-electrode active material for a non-aqueous electrolyte secondary battery according to claim 4, wherein the lithium silicate phase is composed mainly of $Li_2Si_2O_5$, and a diffraction peak of a (111) plane of the $Li_2Si_2O_5$ in the XRD pattern has a half-width of 0.09 degrees or more.

9. The negative-electrode active material for a non-aqueous electrolyte secondary battery according to claim 1, wherein the diffraction peak of the (111) plane of a lithium silicate in the XRD pattern obtained by XRD measurement has a half-width of 0.05 degrees or more.

10. The negative-electrode active material for a non-aqueous electrolyte secondary battery according to claim 1, wherein the lithium silicate phase is composed mainly of $Li_2SiO_3$, and a diffraction peak of a (111) plane of the $Li_2SiO_3$ in the XRD pattern has a half-width of 0.10 degrees or more.

11. The negative-electrode active material for a non-aqueous electrolyte secondary battery according to claim 1, wherein the lithium silicate phase and the silicon particles constitute a base particle, and the base particle is covered with an electrically conductive layer.

12. A non-aqueous electrolyte secondary battery comprising: a negative electrode containing the negative-electrode active material for a non-aqueous electrolyte secondary battery according to claim 1; a positive electrode; and a non-aqueous electrolyte.

13. A non-aqueous electrolyte secondary battery comprising: a negative electrode containing the negative-electrode active material for a non-aqueous electrolyte secondary battery according to claim 7; a positive electrode; and a non-aqueous electrolyte.

* * * * *